United States Patent [19]

Brach et al.

[11] 3,927,026

[45] *Dec. 16, 1975

[54] PROCESS OF MAKING X-FORM METAL PHTHALOCYANINE

[75] Inventors: Paul J. Brach, Rochester, N.Y.; Hugh A. Six, Los Altos, Calif.

[73] Assignee: Xerox Corporation, Stamford, Conn.

[ * ] Notice: The portion of the term of this patent subsequent to Apr. 18, 1989, has been disclaimed.

[22] Filed: Apr. 23, 1973

[21] Appl. No.: 353,838

Related U.S. Application Data

[63] Continuation-in-part of Ser. No. 830,116, June 3, 1969, abandoned.

[52] U.S. Cl. ............................................. 260/314.5
[51] Int. Cl.² .......................................... C09B 47/04
[58] Field of Search .................................. 260/314.5

[56] References Cited
UNITED STATES PATENTS

| | | | |
|---|---|---|---|
| 2,302,612 | 11/1942 | Lacey et al. | 260/314.5 |
| 3,657,272 | 4/1972 | Brach et al. | 260/314.5 |

*Primary Examiner*—Harry I. Moatz
*Attorney, Agent, or Firm*—James J. Ralabate; Donald C. Kolasch; Anthony W. Karambelas

[57] ABSTRACT

A process of preparing X-form metal phthalocyanine comprising the steps of
1. mixing phthalonitrile in an alkylalkanolamine solvent;
2. adding ammonia;
3. seeding the mixture with a catalytic amount of an X-form phthalocyanine after the ammonia addition has been completed;
4. adding a metal salt; and
5. refluxing.

11 Claims, No Drawings

PROCESS OF MAKING X-FORM METAL PHTHALOCYANINE

This application is a continuation-in-part of Ser. No. 830,116, filed June 3, 1969, now abandoned.

BACKGROUND OF THE INVENTION

This invention relates, in general, to phthalocyanine materials and, more specifically, to novel methods for the preparation of X-form metal phthalocyanine.

Phthalocyanine, which also is known as tetrabenzotetrazaporphin and tetrabenzoporphyrazine, may be said to be the condensation product of four isoindole groups. Metal-free phthalocyanine has the following general structure:

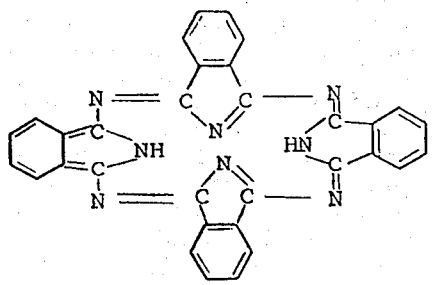

In addition to the metal-free phthalocyanine of the above structure, various centrally-substituted metal phthalocyanines are known in which the two hydrogen atoms in the center of the molecule are replaced by metals from any group of the periodic table. Further, it is well known that from 1 to 16 of the peripheral hydrogen atoms in the four benzene rings of the phthalocyanine molecule may be replaced by halogen atoms and by numerous organic and inorganic groups. The following discussion is directed primarily to centrally-substituted metal phthalocyanines, as described above.

Metal phthalocyanines are known to exist in at least three well-known polymorphic forms, namely, the alpha, beta and gamma forms. These forms may be easily distinguished by comparison of their X-ray diffraction patterns and/or infrared spectra. There is some question whether the reported gamma form is actually a separate polymorph, or is instead merely a less crystalline form of alpha phthalocyanine. In addition to these well-known forms, which exist in both metal-containing and metal-free phthalocyanine, additional polymorphs of metal-containing phthalocyanine are known, i.e., "R"-form disclosed in U.S. Pat. No. 3,051,721, "delta" form described in U.S. Pat. No. 2,160,635 and another "delta" form described in U.S. Pat. No. 2,150,150.

In U.S. Pat. No. 3,357,989 and copending reissue application Ser. No. 741,715, it is disclosed that an especially sensitive form of metal-free phthalocyanine, known as "X metal-free" phthalocyanine, could be prepared by extended dry milling or grinding of the alpha or beta form metal-free phthalocyanine. In copending application Ser. No. 566,839, a second method for the preparation of X metal-free phthalocyanine is disclosed and claimed. This method comprises mixing the alpha crystalline form of metal-free phthalocyanine with a portion of the X metal-free form and an aliphatic organic solvent, and maintaining the mixture until the alpha metal-free form is converted to the X metal-free form. Both methods are time consuming and expensive. Copending application Ser. No. 755,441 discloses a direct method of preparing X metal-free phthalocyanine which comprises mixing phthalonitrile in an ammonia-saturated solvent, heating to reflux temperature, and seeding with mixture with a catalytic amount of X-form phthalocyanine.

The known methods of preparing metal-phthalocyanines include the reaction of phthalonitrile with a metal or metal salt in quinoline or a mixture of quinoline and trichlorobenzene; the reaction of phthalic anhydride, phthalic acid, or phthalamide, urea metal salts, and a catalyst; the reaction of o-cyanobenzamide with a metal; and the reaction of phthalocyanine or replaceable metal phthalocyanine with a metal forming a more stable phthalocyanine. The metal phthalocyanines prepared by the above methods are generally in the alpha or beta polymorphic forms.

Copending application, Ser. No. 756,365, filed in the U.S. Pat. Office on Aug. 20, 1968, discloses and claims metal phthalocyanines in the X polymorphic form as well as a method for their preparation. More specifically, this method comprises rapidly sublimating a metal phthalocyanine polymorph under a pressure of about $10^{-1}$ to about $10^{-6}$ Torr. This method, while quite fast and while producing a high yield of substantially pure X-form metal phthalocyanine, requires the use of complex and expensive evaporation equipment, especially when it is desired to industrially prepare X-form metal phthalocyanine on a large scale.

Copending application, Ser. No. 756,363, filed in the U.S. Pat. Office Aug. 30, 1968, discloses and claims a method of preparing X-metal phthalocyanine which comprises heating the alpha or beta polymorph to from about 600°C. to about 650°C. While the X-form metal phthalocyanine produced by this method has excellent physical properties, there are disadvantages associated with the synthesis. For example, one must employ, as a reactant, a phthalocyanine polymorph rather than the starting material from which said polymorph is obtained. The synthesis thus becomes a two-step process: (1) conversion of a starting material to alpha phthalocyanine, and (2) conversion of the alpha to the X-form or conversion first from the alpha to the beta form, and then from the beta to the X-form. Moreover, in the preparation of alpha metal-free phthalocyanine for further conversion to the X-form, many difficulties have been encountered. The use of metal-free phthalocyanine in xerographic applications places stringent requirements on the purity of this material. It is required that the phthalocyanine intended for use in a xerographic plate generally be free of impurities or contaminates which in one way or another interfere with the xerographic system, whether it be in the charge acceptance or charge dissipation step or other steps in the electrographic system. Until now, phthalocyanine has been prepared almost exclusively for use as a pigment, where color, tinctorial strength, light fastness, dispersibility, etc., are prime considerations and purity is incidental. As a result, reported methods of synthesis (see "Phthalocyanine Compounds" by Moser and Thomas, Rheinhold Publishing Company, pages 104–189) often introduce complex organic materials as impurities which are difficult to remove.

SUMMARY OF THE INVENTION

It is, therefore, an object of this invention to provide a method for preparing X-form metal phthalocyanine devoid of the above-noted disadvantages.

It is another object of this invention to provide a one-step direct method for the preparation of X-form metal phthalocyanine.

It is still another object of this invention to provide a simple and rapid method of preparing X-form metal phthalocyanine.

It is yet another object of this invention to provide a more reliable and dependable method of preparing X-form metal phthalocyanine.

It is still another further object of this invention to provide an economical method of preparing X-form metal phthalocyanine.

The foregoing objectives and others are accomplished in accordance with this invention, generally speaking, by providing a novel system for the preparation of X-form metal phthalocyanine which comprises mixing phthalonitrile in an alkylalkanolamine solvent, adding ammonia, a catalytic amount of an X-form phthalocyanine, either metal or metal-free, and a metal salt, and refluxing.

More specifically, a solution of phthalonitrile is prepared in an alkanolamine solvent. Heat is normally required to have the phthalonitrile go into solution so that a temperature of, for example, 90°C is normally employed. Ammonia gas may then be bubbled through the solution and the temperature is raised to a point just below reflux, for example, to about 120°C. This is done in order to decrease the time required in order to obtain reflux temperature, for example, 135°C, after which ammonia addition is terminated and the metal salt and catalyst are added. The solution is then seeded with a catalytic amount of X-form phthalocyanine in either the metal or metal free form. The solution so prepared is now ready to react with the metal salt in order to produce the X-form metal phthalocyanine product desired. The metal salt is then added and the solution is rapidly brought to reflux for sufficient time to produce the X-form metal phthalocyanine desired. Various steps of the synthesis as outlined are performed in a critical sequence, that is, the phthalonitrile precursor must be put into an alkanolamine solvent normally with the use of heating before ammonia is added. Ammonia must then be bubbled through the solution and the addition of ammonia stopped before the solution is seeded with a catalytic amount of X-form phthalocyanine which may either be metal or metal free. The metal salt is then added and the solution is rapidly brought to reflux for sufficient amount of time in order to produce the X-form metal phthalocyanine desired. If any of the above steps as outlined are interchanged, mixtures of alpha, beta, and X-form are obtained. More significantly, if the heating step is not performed last, beta polymorphic phthalocyanine, either metal or metal free depending on whether the metal salt has been added, will result rather than X-form metal phthalocyanine.

It is found as recited in U.S. Pat. No. 3,657,272 that in order to produce the X-form metal free product, phthalonitrile must be mixed in a pre-heated ammonia saturated alkanolamine solvent and then heated to reflux before seeding with a catalytic amount of X-form metal free phthalocyanine. If the pre-heating step and the ammonia saturation step are not performed prior to refluxing and seeding with a catalytic amount of X-form metal-free phthalocyanine, the beta metal-free phthalocyanine will result rather than X-form metal free. On the other hand, in order to produce the X-form metal phthalocyanine as indicated above, it is critical that heating at reflux be performed as the final step for a sufficient time in order to produce the desired X-form metal phthalocyanine. In addition, it is also to be noted that in producing the product of the instant invention, it is desirable to minimize any pre-heating such as that normally performed in order to place the phthalonitrile into solution so that after the ammonia addition is terminated and before the catalytic amount of X-form phthalocyanine is added, the reaction mixture is quickly raised to just below the reflux temperature or in thee neighborhood thereof so that refluxing may be quickly performed once the catalyst and metal salt are added and the time for refluxing thereby controlled.

Any suitable solvent may be used in this system. Typical solvents are alkylalkanolamines such as 2-dimethylaminoethanol, 1-dimethylamino-2-propanol, 1-diethylamino-2-propanol, 2-dimethylamino-2-methyl-1-propanol, 2-diethylaminoethanol, 3-dimethylamino-1-propanol, 2-(di-iso-propylamino) ethanol, 2-butylamino-ethanol, 2-dibutylaminoethanol, 2-dibutylaminoethanol, 2[(2-diethylamino)ethyl) amino] ethanol, 2,2'-(butylimino) diethanol, 2-ethylaminoethanol, 2,2-(ethylimino) diethanol, 2-methyl-aminoethanol, 2,2'- (methylimino) diethanol, 2-(iso-propylamino) ethanol, 2,2'-(isopropylimino) diethanol, 2,2'-(tert.-butylimino) diethanol, and 3-diethylamino-1-propanol, among others. Although any suitable solvent may be used in this system, it is preferred that solvents containing a primary alcohol group be employed in order to obtain a higher yield of the final desired product. While any suitable solvent containing a primary alcohol group may be used in this invention, significantly high yields of X-form metal phthalocyanine are obtained with the use of 2-dimethylaminoethanol and, accordingly, this particular solvent is most preferred.

Although the synthesis of the present invention may be carried out at any suitable temperature, the range of about 120°C. to about 280°C. has been found convenient. While any appropriate temperature may be employed, it is preferred that a temperature generally in the range of about 135°C. to about 150°C. be used in order to obtain higher yields of the desired final product.

The catalytic amount of X-phthalocyanine, either metal and/or metal-free, employed in this synthesis may be prepared by any of the methods mentioned above.

The total reaction time of the instant invention is about 10 to about 70 minutes depending on the particular solvent and temperature employed. If the reaction proceeds much past about 70 minutes reaction time, beta metal phthalocyanine formation begins to take place and mixtures of X-form and beta-form phthalocyanines are obtained. A preferred reaction time is about 30 to about 55 minutes with 2-dimethylaminoethanol in order to obtain a high yield of pure X-form metal phthalocyanine.

Any suitable mixing process may be used to slurry the phthalonitrile in the solvent. A complete conversion from phthalonitrile is attained where the mixture is heated, stirred during the conversion and ammonia gas is bubbled through said mixture. The mixing may be carried out by milling with glass or steel balls or merely by stirring with a magnetic bar or simple rotating agitator. While the phthalonitrile may be dissolved in the solvent at any suitable temperature, it is preferable to dissolve these materials when said solvent is heated to about 90° – 120°C.

After the phthalonitrile is added to the hot solvent and ammonia gas is bubbled through the mixture, a catalytic amount of X phthalocyanine is added. A metal salt is then added to the mixture and the temperature immediately rises to reflux due to a rapid exothermic reaction. The mixture is then maintained at reflux temperature for about 5 to about 70 minutes depending upon the solvent used, filtered hot, washed, and dried.

DESCRIPTION OF THE PREFERRED EMBODIMENTS

The following examples will further define various preferred embodiments of the present invention. Parts and percentages are by weight unless otherwise specified.

The crystal forms of metal phthalocyanine produced in each of the following examples are analyzed by conventional X-ray and infrared analysis methods. The X-ray and infrared curves produced by the materials prepared in each of the following examples are compared to curves for known alpha, beta and X-form metal-free phthalocyanine as described in detail in the copending application Ser. No. 741,715 which is a reissue application of U.S. Pat. No. 3,357.989, as well as to curves for the alpha, beta and X polymorphs of the metal phthalocyanines.

EXAMPLE I

About 200 ml. of 2-dimethylaminoethanol is placed in a 4-neck, 500 ml. round bottom flask equipped with a mechanical stirrer, reflux condensor, thermometer, and gas inlet tube. The solution is then heated to about 90°C. at which temperature about 65 g. of phthalonitrile is added. A steady stream of ammonia gas is then introduced for about 15 minutes while the solution is heated to about 120°C. After the ammonia addition is terminated, about 0.02 g. of X-form phthalocyanine is added followed by about 11 g. of anhydrous cuprous cyanide and the reaction temperature immediately rises to reflux (about 135°C.). Heating is continued for about 15 minutes. The mixture is then filtered hot and the residue is thoroughly washed with ethanol, acetone, and methanol. An aqueous solution of sodium cyanide is used to remove unreacted cuprous cyanide. After this treatment, the blue solid is washed to a pH of 7 with water, followed by 1 N hydrochloric acid, then water, then a 1% solution of ammonium hydroxide, then water, and finally with methanol. The product is then oven-dried at about 70°C. for a bout 2 hours. The resulting material is brilliant royal blue in color - yield, about 80%. This material is subjected to conventional X-ray and infrared analysis. Analysis shows a generation of X-form copper phthalocyanine.

EXAMPLE II

About 175 ml. of 2-dimethylaminoethanol is placed in a 500 ml. flask, equipped as in Example I. The solution is heated slowly to about 110°C., at which temperature about 65 g. of phthalonitrile is added. Ammonia gas is then passed through the mixture for about 25 minutes while the solution is heated for about 20 minutes to about 125°C. After the ammonia addition has been terminated, about 0.03 g. of X-form metal-free phthalocyanine is added followed by about 16.2 g. of anhydrous cobaltous chloride and the reaction temperature immediately rises to reflux (135°C.). Heating is continued for about 20 minutes. A purple precipitate is removed from the hot reaction mixture by filtration and thoroughly washed with ethanol and acetone. The resulting purple needle-like crystals are oven dried at about 75°C. for about 1½ hours. The brilliant purple material-yield, about 85%, is then subjected to conventional X-ray and infrared analysis. Analysis indicates the production of X-form cobalt phthalocyanine.

EXAMPLE III

The experiment of Example I is repeated, except that about 250 ml. of 3-dimethylamino-1-propanol is employed in place of the 2-dimethylaminoethanol, about 100 g. rather than 80 g. of phthalonitrile are used, and heating is maintained for about 30 minutes rather than about 45 minutes prior to filtering. The product-yield, about 30%, is analyzed by X-ray and infrared analysis and shows production of X-form copper phthalocyanine.

EXAMPLE IV

As a control for the conversion process of Example III, the experiment is repeated, allowing the mixture to be heated for 75 minutes rather than 30 minutes prior to filtering. X-ray and infrared analysis show the product to be a mixture of X-form and beta copper phthalocyanines.

EXAMPLE V

The conversion process of Example I is attempted, allowing the mixture to be heated for 90 minutes rather than 50 minutes prior to filtering. X-ray and infrared analysis show complete conversion to beta copper phthalocyanine.

EXAMPLE VI

As a further control for the conversion process of Example III, there is no addition of the catalytic amount of X-form phthalocyanine. Analysis indicated that no conversion to the X-metal form takes place.

EXAMPLE VII

The experiment of Example I is repeated using 1-dimethylamino-2-propanol (boiling point about 126°C.) in place of 2-dimethylaminoethanol (boiling point about 135°C.) and 0.02 g. of X- Cu phthalocyanine in place of 0.02 g. metal-free phthalocyanine. The percentage yield of the final product, which is found by X-ray and infrared analysis to be X-form copper phthalocyanine, is less than the yield in Example I — about 25% yield as opposed to about 80%.

EXAMPLES VIII – XI

Example II is repeated four successive times using 0.125 moles of anhydrous magnesium chloride, anhydrous zinc chloride, anhydrous cadmium cyanide and anhydrous calcium chloride, respectively, in place of the 0.125 moles of cobaltous chloride used in Example II. The resulting products are subjected to X-ray and infrared analysis and data from same are compared to spectra of corresponding alpha and beta metal polymorphs as well as to various X metal phthalocyanine spectra. Analysis indicates generation of X-form magnesium phthalocyanine; X-form zinc phthalocyanine; X-form cadmium phthalocyanine; and X-form calcium phthalocyanine, respectively.

While specific components of the present system are defined in the working examples above, any of the other typical materials indicated above may be substituted in said working examples if appropriate. In addition, many other variables may be introduced in the present process, such as further purification steps or other reaction components which may in any way affect, enhance, or otherwise improve the present process.

While various specifics are cited in the present application, many modifications and ramifications will occur to those skilled in the art upon a reading of the present disclosure. These are intended to be encompassed within the scope of this invention.

What is claimed:

1. A method of preparing X-form metal phthalocyanine comprising the steps of:
   a. mixing phthalonitrile in an alkylalkanolamine solvent;
   b. adding ammonia to the mixture;
   c. terminating the ammonia addition
   d. adding a catalytic amount of an X-form phthalocyanine;
   e. adding a metal salt; and
   f. refluxing.

2. The method of claim 1 wherein said metal salt is selected from the group consisting of a copper salt, a cobalt salt, a magnesium salt, a zinc salt, a cadmium salt, a calcium salt, and mixtures thereof.

3. The method of claim 1 wherein said metal salt is a copper salt.

4. The method of claim 1 wherein said metal salt is a cobalt salt.

5. The method of claim 1 therein said alkylalkanolamine contains a primary alcohol group.

6. The method of claim 1 wherein said alkylalkanolamine is 2-dimethylaminoethanol.

7. The method of claim 1 wherein said phthalonitrile is mixed with the solvent when said solvent is at a temperature of from about 90°C to about 120°C.

8. The method of claim 1 wherein the resulting material is filtered hot after refluxing.

9. The method of claim 1 wherein said ammonia is added for from about 5 to about 30 minutes.

10. The method of claim 1 wherein said refluxing is maintained for from about 30 to about 55 minutes.

11. The method of claim 1 wherein said mixture is stirred until generation of X-form metal phthalocyanine is complete.

* * * * *